United States Patent [19]
Boutet et al.

[11] Patent Number: 5,995,125
[45] Date of Patent: Nov. 30, 1999

[54] DRY LASER PRINTING SYSTEM

[75] Inventors: John C. Boutet, Rochester; Kwok L. Yip, Webster, both of N.Y.

[73] Assignee: Eastman Kodak Company, Rochester, N.Y.

[21] Appl. No.: 09/217,051

[22] Filed: Dec. 21, 1998

Related U.S. Application Data

[60] Provisional application No. 60/109,824, Nov. 25, 1998.

[51] Int. Cl.$^6$ ........................................................ B41J 2/47
[52] U.S. Cl. .......................... 347/156; 347/212; 219/216; 430/350; 430/353
[58] Field of Search ..................................... 347/212, 155, 347/156; 430/99, 350, 353; 399/222; 219/216

[56] References Cited

U.S. PATENT DOCUMENTS

| | | | |
|---|---|---|---|
| 3,371,915 | 3/1968 | Kawamura et al. | 219/216 |
| 5,790,069 | 8/1998 | McDaniel et al. | 347/156 |
| 5,893,003 | 4/1999 | Allen | 219/216 |

*Primary Examiner*—Huan Tran
*Attorney, Agent, or Firm*—William F. Noval

[57] ABSTRACT

A processor for processing thermal media, comprising: a rotatably mounted heated drum; and a set of holddown rollers spaced around a segment of the periphery of the drum and in contact therewith, the drum and the set of rollers forming a path for thermal media; wherein the set of rollers includes at least first and second rollers of different diameters one from the other in order to suppress artifacts.

1 Claim, 2 Drawing Sheets

DRY LASER PRINTING SYSTEM

This application is a continuing application of provisional application Serial No. 60/109,824, filed on Nov. 25, 1998.

FIELD OF THE INVENTION

This invention relates in general to dry laser printing systems and more particularly to a thermal processor for laser exposed dry media which effects artifact suppression.

BACKGROUND OF THE INVENTION

One way of heat processing media in a photothermographic processor is to bring it in contact with a heated drum. To maintain good media contact with the drum, a plurality of hold-down rollers can be used to hold the film against the drum. Since these hold-down rollers are generally only heated by contact with the drum, the first few hold-down rollers are cooled by the entering media until they reach a temperature equilibrium maintained by the heat flow from the drum, through the media in the contact nip. The highest rate of cool-down takes place during the first few revolutions of the hold-down rollers nip. The highest rate of cool-down takes place during the first few revolutions of the hold-down rollers on the film near the lead edge. This can produce a "once-around" stepwise density drop along the film as the roller surfaces drop in temperature with each revolution against the cooler film as illustrated in FIG. 1. Silicone foam covered rollers have proven to have good durability and sufficiently low thermal conductivity to keep the lead edge "once-around" stepwise density drop to a very low level. Each step is $\pi*d$ long (d=roller dia.) and represents one revolution of the hold-down rollers. The first few rollers that the film contracts while it is still heating up undergo the largest temperature drop and contribute the most to the density steps.

It should be noted that since all rollers are the same diameter, the "once-around" contribution of each roller is added in perfect registration to that of the others since the edge of each density step is located $n*\pi*d$ from the lead edge of the film where n is the number of revolutions.

SUMMARY OF THE INVENTION

According to the present invention, there is provided a solution to the problems of the prior art.

To further reduce or eliminate the visibility of the lead edge "once-around" artifact, the first few rollers can be chosen to all be of different diameters one from the other so that the length of the "once-around" each roller contributes is a different length. This has the effect of making the step density transition less visible to the eye by breaking it up into several smaller magnitude "substeps". To illustrate this, FIG. 2a shows the benefit of using three different roller diameters at the entrance of a hot drum processor. Only the first "once-around" step is shown. By using the 0.375", 0.46", and 0.54" roller diameters shown in FIG. 2b, the step at the end of the first "once-around" is broken into three smaller steps separated by $\pi*\Delta d$ where $\Delta d$ is the difference in roller diameter. In FIG. 2a, it is assumed that only the first three rollers are the prime contributors to the "once-around" artifact and that each contributes equally making the substeps equal in height. FIGS. 3a and 3b show a case where the first four rollers are involved had graduated in diameter. The more substeps the edge of the "once-around" can be broken into, the smaller the density difference $\Delta D$ of each substep is, and the less visible to the eye it is.

The $\Delta D$ contribution from each roller is not necessarily the same since the first roller undergoes a greater temperature drop than the second, etc. How many rollers have an impact and how great it is, is a function of the roller diameter(s), media, drum and roller materials, nip-to-nip spacing, and drum speed. Generally, the substep caused by the first roller has the largest density shift.

ADVANTAGEOUS EFFECT OF THE INVENTION

The use of multiple roller diameters is an easy way of eliminating or reducing the visibility of the lead edge "once-around" higher density band which is sometimes discernible in thermal processors which keep the film against the drum with hold-down rollers.

DETAILED DESCRIPTION OF THE INVENTION

The "once-around" stepwise density drop is most obvious if the roller surface material has a heat capacitance and a heat transfer coefficient near that of the media. Other disclosures have described using roller materials with a very high or a very low heat transfer coefficients to reduce the visibility of this artifact. A very large heat transfer coefficient causes the tread and riser of the "once-around" density steps to tilt and become a density ramp. This is because the internal heat transfer in the roller becomes great enough to maintain the surface temperature of the roller near the average temperature of the roller as it loses heat to the film.

A very low heat transfer coefficient in the roller material reduces the height of the density steps by reducing media heating rate differences causes by the changing roller temperatures. Reducing the "once-around" density step visibility by reducing the heat transfer coefficient of the roller has the advantage of improving in-sheet and sheet-to-sheet processing uniformity compared to using the high heat transfer coefficient approach. The main difficulty in taking this approach is finding a durable roller material with a low enough heat conductance and/or heat capacitance to make the "once-around" density steps so small in magnitude they cannot be seen.

Figure 1:
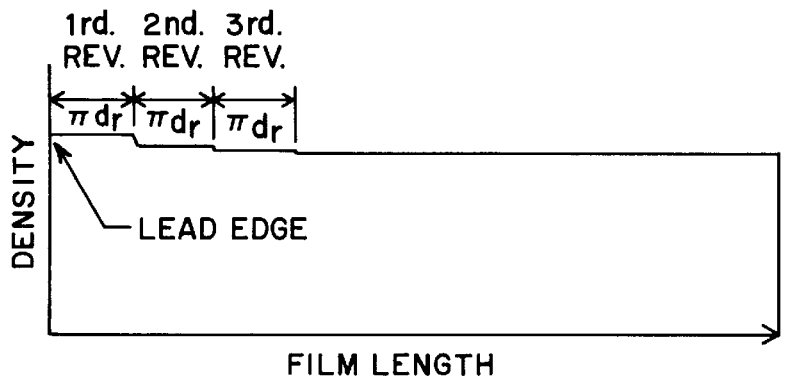
FIGS. 1, 2a, 3a, and 5 are graphical illustrations useful in explaining the present invention.

FIG. 1 represents a plot of density along the length of a flat field exposure which shows three lead edge "once-around" steps. Such a result implies that the first few rollers which contacted the film contributed heat to warm the film during their first three rotations. With each rotation of the rollers against the film the rollers cooled and had less energy to transfer to the film the following rotation. By the time the rollers made three rotations they were near their equilibrium temperature with the film and their continued temperature change was too small to visibly affect film density.

The number of rollers which contribute to lead edge "once-around" density steps depends on the media velocity, the diameter and spacing of the pressure rollers, the heat transfer and heat capacitance characteristics of the drum, pressure roller and media materials. If, for example, the film has reached the drum temperature by the time it reaches the third pressure roller, only the first two rollers can contribute significantly to the phenomena since the third roller is not cooled by the film. If doubling the film velocity result in the film reaching the drum temperature by the time it reaches roller six, the first five rollers contribute to the phenomena. In a real system, of course, the film never fully reaches the drum temperature and therefore even the last roller adds a tiny contribution to the artifact.

It should be noted that the number of "once-around" steps visible on the film is generally not the same as the number of rollers which significantly contribute to the steps. With our 0.5" diameter silicone foam pressure rollers and 0.030" thick 1 W/m°K high conductivity silicone on a 6" diameter thermal drum with 180° film wrap, the first once around is generally the only one visible with the second "once-around" only just noticeable on the most sensitive media processed at the high end of processing temperature range. The density drop ($\Delta D$) at the end of the lead step we can often see with silicone foam rollers is generally 0.02 or less.

A simulation of the visual impact of breaking the 0.02 $\Delta D$ edge at the end of the first "once-around" step into offset substeps was performed and it confirmed the potential effectiveness of the approach. For this simulation, the assumption was made the contribution of the n rollers most involved was equal and that the 0.02$\Delta D$ density step could be divided into n substeps of 0.02/n $\Delta D$. By the time the "once-around" step was divided into four substeps (case III) the artifact printed on the HeNe film with the 2180 printer was barely visible. This result is due tot he fact that the density difference between two neighboring substeps (0.005)is smaller than the threshold value of discernible density difference by the eye which is 0.0052. In these simulations, the step edge was much sharper than is seen with the foam rollers which yield a fuzzier edge. Consequently, dividing the 0.02 $\Delta D$ density step into two or three substeps in a foam roller processor would probably suffice.

Tests were also run on a foam roller processor breadboard to evaluate the practicality of this approach. Roller configurations were tested with: all 0.5" diameter rollers; one 0.375" roller in position one and the rest 0.5"; and with two 0.375" rollers followed by 0.5" rollers. The results showed a progressive reduction of the visibility of the step. Even with two leading 0.375" diameter rollers, the $\pi$*0.375" step edge was not yet discernible, indicating many rollers are involved in this artifact process. In this 14 roller breadboard, four to six leading 0.375" diameter rollers would be needed to break the step into two equal barely discernible substeps.

A surefire way of evenly dividing the step density is to alternate roller diameters throughout the processor. This yields a design in which equal density division is certain and is insensitive to material property or process time variations.

Hot drum processors which hold the film in contact with the drum by means of one or more contact rollers have the potential problem of printing out a lead edge dark hand $\pi \times d_r$ long where $d_r$ is the holddown roller diameter. In some cases, depending heat capacitance and conductance of the roller, two or more decreasing density steps are printed, each $\pi d_r$ long to give a density profile on a uniform exposure sheet of media as shown in FIG. 1.

This artifact can be eliminated by having a roller which has a heat transfer coefficient of 0. The staircase density drop can be changed to a product ramp which cannot be detected by the eye by using highly internally conductive rollers which have a conductivity approaching $\infty$. This insures the surface temperature is always equal to the average temperature of the roller, resulting in a gradual density drop until the roller reaches a steady state temperature. This generally requires several sheets of film fed head-to-tail to achieve steady state. An asymptotic density drop along the length films required to reach steady state can be measured. These in-sheet or sheet-to-sheet density drops can be eliminated or reduced by resheeting the entrance roller(s) as previously described.

When using low density silicone foam rollers, the thermal conductivity is in the 0.06 W/m°K range and the visible effect on the lead edge is a 0.01 to 0.03 lead edge once around $\pi$*$d_r$ long. Generally, the second once around step is too slight to be visible.

Replacing the first roller with a solid stainless steel roller only slightly reduces the magnitude of the step indicating the first two to four rollers are involved in printing this artifact. (An all stainless steel roller processor can produce a lead edge once around step in the 0.001–0.003 range.)

Figure 2A:
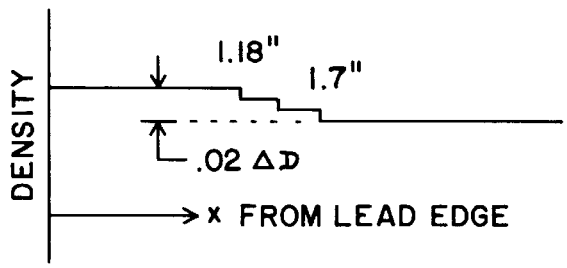
Figure 2B:
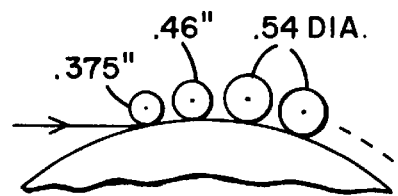
FIGS. 2b, 3b, and 4 are diagrammatic views of embodiments of the present invention.
Figure 3A:
Figure 3B:
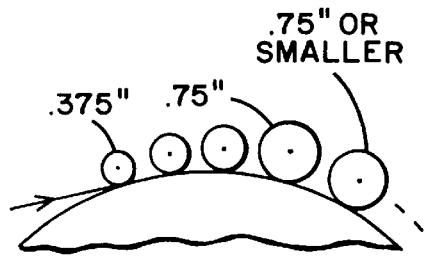

How readily a 0.02 density step can be seen as a function of how sharp the transition is for a given viewing distance. To reduce the visibility of the artifact, I propose using graduated diameter nip rollers starting with a 0.375" diameter first roller. (Smaller would be better, but for a 144" span, a practical limit is around ¾' for stiffed reasons.) This yields a 1.18" long step. If three rollers are involved for a given foam in producing the artifact and the final roller diameter is to be 0.540" which yields a 1.7" long step, the second roller should be 0.46" diameter to provide an intermediate length once around contribution 1.44" long. This is shown in FIG. 2a.

Figure 4:
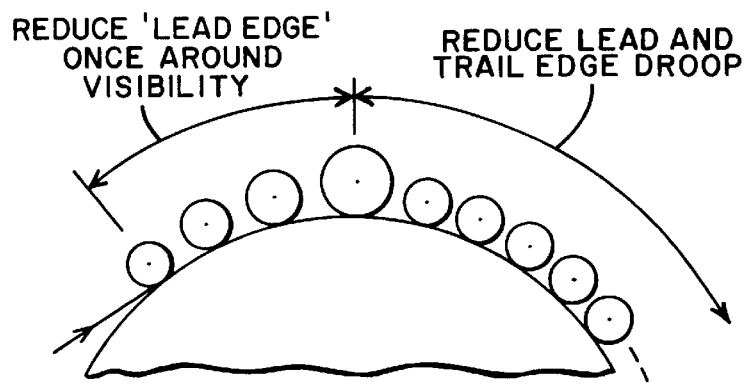

This makes a minor artifact almost invisible to the eye. In this case, the fifth through the last roller could revert back to $\approx$½" rollers which can be closely spaced to suppress the lead edge and trail edge density droop which is proportional to the nip to nip spacing. This is shown in FIG. 4.

Figure 5:
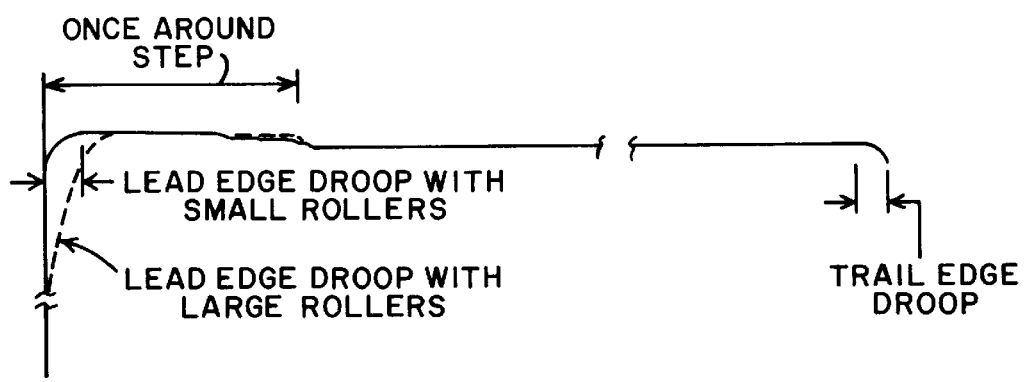

The lead and trail edge density droop is shown in FIG. 5. It is caused by the film ends separating from the drum as they travel the distance between rollers. Reducing the nip to nip distance or increasing the drum diameter reduces the lead and trail edge density droop.

The invention has been described in detail with particular reference to certain preferred embodiments thereof, but it will be understood that variations and modifications can be effected within the spirit and scope of the invention.

What is claimed is:

1. A processor for processing thermal media, comprising:
    a rotatably mounted heated drum; and
    a set of holddown rollers spaced around a segment of the periphery of said drum and in contact therewith, said drum and said set of rollers forming a path for thermal media;
    wherein said set of rollers includes at least first and second rollers of different diameters one from the other in order to suppress artifacts.

* * * * *